(12) United States Patent
Schleef et al.

(10) Patent No.: US 7,343,956 B2
(45) Date of Patent: Mar. 18, 2008

(54) PROTECTION DEVICE FOR A VEHICLE INTERIOR

(75) Inventors: Thomas Schleef, Porta Westfalica (DE); Gunter Haebe, Stuttgart (DE); Juergen Wurster, Altensteig-Berneck (DE)

(73) Assignee: Bos GmbH & Co. KG, Ostfildern (DE)

( * ) Notice: Subject to any disclaimer, the term of this patent is extended or adjusted under 35 U.S.C. 154(b) by 224 days.

(21) Appl. No.: 11/141,713

(22) Filed: Jun. 1, 2005

(65) Prior Publication Data

US 2005/0269047 A1    Dec. 8, 2005

(30) Foreign Application Priority Data

Jun. 8, 2004    (DE)    ............... 10 2004 029 042

(51) Int. Cl.
*E06B 9/08* (2006.01)
(52) U.S. Cl. .............. 160/23.1; 160/89; 296/37.16
(58) Field of Classification Search ............ 160/23.1, 160/24, 21, 263, 323.1, 370.22, 318, 313, 160/324, DIG. 15, 89; 296/37.16; 242/579, 242/585

See application file for complete search history.

(56) References Cited

U.S. PATENT DOCUMENTS

| | | | | |
|---|---|---|---|---|
| 4,277,097 A | * | 7/1981 | Lalanne | ............ 296/37.16 |
| 5,466,326 A | * | 11/1995 | Cherney | ............ 156/359 |
| 6,155,326 A | * | 12/2000 | Imhoff et al. | ............ 160/243 |
| 6,843,518 B2 | * | 1/2005 | Schlecht et al. | ......... 296/24.34 |
| 2004/0154753 A1 | * | 8/2004 | Tagtow et al. | ............ 160/23.1 |
| 2005/0269045 A1 | * | 12/2005 | Rejc | ............ 160/264 |

FOREIGN PATENT DOCUMENTS

| | | |
|---|---|---|
| DE | 198 32 360 C1 | 1/2000 |
| DE | 203 19 620 U1 | 4/2004 |
| EP | 0 214 318 A1 | 3/1987 |
| JP | 11081828 A | 3/1999 |
| WO | WO 00/05479 | 2/2000 |

* cited by examiner

*Primary Examiner*—Blair M. Johnson
(74) *Attorney, Agent, or Firm*—Flynn, Thiel, Boutell & Tanis, P.C.

(57) ABSTRACT

A protection device for a vehicle interior has a flexible sheet-like structure which is arranged movably between a compactly put-away rest position and an extended functional position and which is connected on the end side transversely to the direction of extension over its width to a dimensionally stable profiled part. The sheet-like structure has a sheet-like section which is extended over its width and is connected extensively and cohesively to a sheet-like section of an outer casing of the profiled part.

9 Claims, 2 Drawing Sheets

PROTECTION DEVICE FOR A VEHICLE INTERIOR

CROSS REFERENCE TO RELATED APPLICATIONS

The following disclosure is based on German Patent Application No. 10 2004 029042.3 filed on Jun. 8, 2004, which is incorporated into this application by reference.

FIELD OF THE INVENTION

The invention relates to a protection device for a vehicle interior, having a flexible sheet-like structure which is arranged movably between a compactly put-away rest position and an extended functional position and which is connected on the end side transversely to the direction of extension over its width to a dimensionally stable profiled part.

BACKGROUND OF THE INVENTION

WO 00/05479 A1 discloses a flexible sheet-like structure which can be fastened on a winding shaft. For the fastening of the flexible sheet-like structure, the winding shaft has, on its outer circumference, a groove which runs over the entire length of the winding shaft in the longitudinal direction thereof and into which a hot-melting adhesive is placed in the form of a bead. The adhesive bead protrudes slightly over the outer circumference of the winding shaft. The flexible sheet-like structure is fitted onto the winding shaft over the entire width thereof and is heated by means of a smoothing iron in such a manner that the adhesive bead melts onto the lower side of the flexible sheet-like structure over the width thereof. In the solid state, the adhesive bead forms a type of piping which can be pulled into the longitudinal groove of the winding shaft from one end side of the winding shaft or can be removed therefrom.

SUMMARY OF THE INVENTION

It is the object of the invention to provide a protection device of the type mentioned at the beginning which, with simple means, enables the sheet-like structure to be reliably fixed on the dimensionally stable profiled part.

This object is achieved in that the sheet-like structure has a sheet-like section which is extended over its width and is connected extensively and cohesively to a sheet-like section of an outer casing of the profiled part. By means of the solution according to the invention, it is possible to design the profiled part in a manner such that it has a smooth surface over its entire outer casing without there having to be a receiving groove or the like. In a particularly preferred manner, the profiled part is designed as a hollow or solid cylindrical shaft. The sheet-like structure can be wound onto a shaft of this type. As an alternative, it is possible to fasten the sheet-like structure extensively and cohesively to a profiled part in the form of a cassette housing. In an embodiment of this type, the sheet-like structure is attached on the outside extensively to the outer casing of the cassette housing. The solution according to the invention is provided, in particular, for protection devices in the form of boot coverings and/or boot separating nets. However, it is also possible to provide the solution according to the invention for sun blinds which are arranged in the region of vehicle windows in order to protect the vehicle interior against strong sunshine from the outside. The flexible sheet-like structure can be arranged on a winding shaft in a manner such that it can be wound up and unwound, with the result that the compactly put-away rest position constitutes the wound-up position of the sheet-like structure. As an alternative, it is possible to fold up the sheet-like structure in its compactly put-away rest position in a folded arrangement looped over one or more times. In all of the embodiments, the extended functional position constitutes a stretched-open or extensively spread-out position of the sheet-like structure. A weld is preferably provided as the cohesive connection of the sheet-like structure to the outer casing of the profiled part. As an alternative, it is possible to produce the cohesive connection by means of a liquid adhesive which is distributed extensively over the corresponding sheet-like sections and, after the corresponding sheet-like section of the sheet-like structure has been attached to the corresponding sheet-like section of the profiled part, cures, preferably at room temperature. The connecting surface provided by the sheet-like sections is of such large dimensions that tensile forces or tensile expansion forces which act on the sheet-like structure in the extended functional position of the sheet-like structure do not permit the cohesive connection to be released. This ensures that an embodiment of the protection device as a boot covering retains even an item being transported which impacts from below against the stretched-open sheet-like structure in the event of a vehicle impact or other severe deceleration of this type, and does not lead to the sheet-like structure tearing off in the region of the cohesive connection to the profiled part.

Firstly, the sheet-like structures provided are, in particular, covering structures which can be used as a covering for the boot. Secondly, the sheet-like structures may be designed as separating nets which can be stretched-open approximately vertically. Finally, it is also possible to provide sheet-like structures which cover just a subregion of a width of the vehicle interior and are extended between a cassette housing of a boot covering and a movable part of a rear seat bench.

In one refinement of the invention, both the sheet-like structure and the profiled part are provided in each case with a weldable plastic surface at least in the region of the interconnected surface sections. The plastic surface may be formed just in some sections or over the entire surface of the outer casing of the profiled part. The plastic surface may be formed by a coating or else by the sheet-like structure and/or the profiled part being entirely formed from plastic. The sheet-like structure itself can be produced either directly from a weldable plastic sheeting, or the sheet-like structure is produced from a textile material and correspondingly coated with plastic just in the region of the sheet-like section. It is also possible for the profiled part to be designed either at least in some sections with a surface layer of weldable plastic and otherwise be produced from metal or another material, or it is produced entirely from a weldable plastic material.

In a further refinement of the invention, the profiled part is laminated with a weldable plastic, in particular PVC, at least in the connecting region. The profiled part itself is preferably produced from metal, in particular an aluminum extruded profile. This embodiment is preferably suitable for the design of the profiled part as a cassette housing of a boot covering and/or of a boot separating net.

Further advantages and features of the invention emerge from the claims and from the description below of preferred exemplary embodiments of the invention, which is illustrated with reference to the drawings.

DETAILED DESCRIPTION OF THE INVENTION

Figure 1:
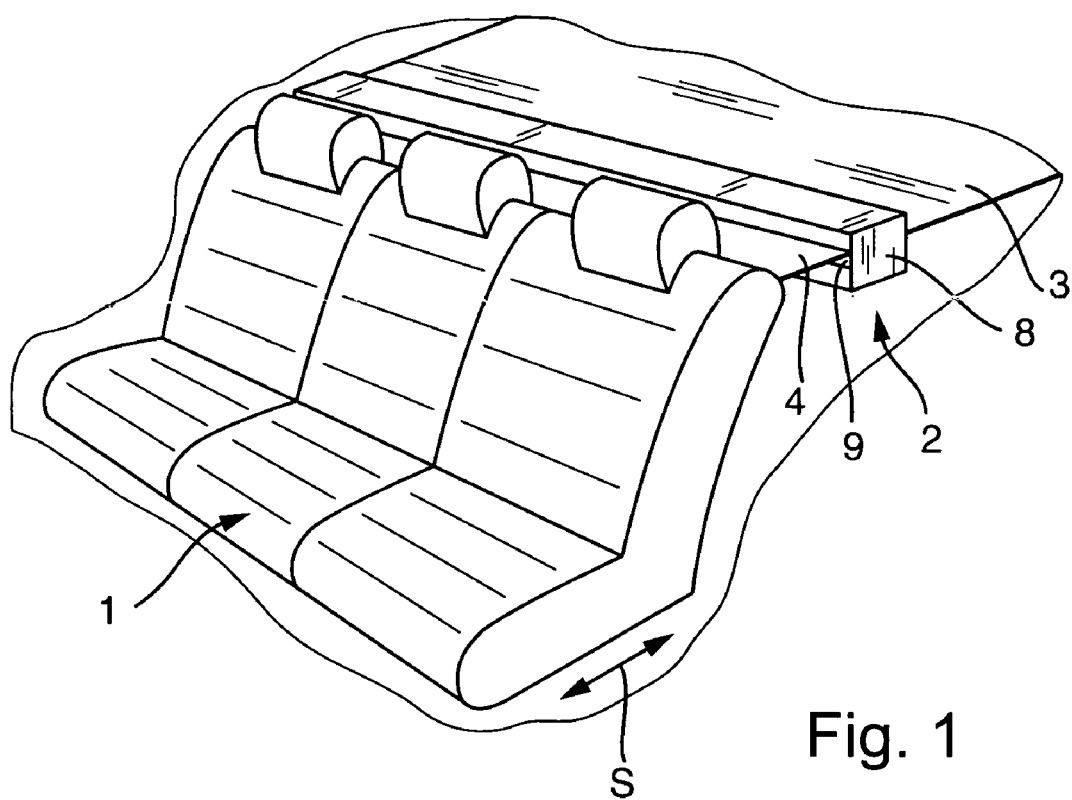
FIG. 1 shows, in a diagrammatic, perspective illustration, a detail of a vehicle interior of a passenger vehicle together with an embodiment of a protection device according to the invention.

A passenger vehicle in the form of an estate car or in the form of a large-capacity saloon has a vehicle interior which, according to FIG. 1, is equipped with a multipart rear seat bench 1. As illustrated diagrammatically with reference to the arrow S in FIG. 1, the rear seat bench 1 is arranged in a manner such that it can be displaced in the longitudinal direction of the vehicle. As a result, it is possible to arrange the rear seat bench 1 in different positions within the vehicle interior and thus—depending on requirements—to correspondingly enlarge or reduce a boot or a passenger compartment of the vehicle interior.

Arranged behind the rear seat bench is a protection device 2 which has a cassette housing 8 in which is provided a boot covering which is provided with a flexible sheet-like structure 3. The flexible sheet-like structure 3 is held, according to FIG. 2, in a manner such that it can be wound up and unwound on a winding shaft 5 mounted in the cassette housing 8 about an axis of rotation D. In a wound-up position, the sheet-like structure 3 is accommodated in the cassette housing 8. The sheet-like structure 3 is extended through an extension slot (not illustrated specifically) on a rear side of the cassette housing 8 and, in a stretched-open functional position (illustrated in FIG. 1), is fastened releasably in securing means fixed on the vehicle in a rear region of the boot. On the vehicle side, the cassette housing 8 is fastened in the vehicle interior. Arranged on the cassette housing 8 is a further, short, flexible sheet-like structure 4 which, starting from the cassette housing 8, extends forward to a backrest arrangement of the rear seat bench 1 and is fastened by its front end region releasably to the backrest arrangement of the rear seat bench 1. This sheet-like structure 4 serves as a covering for an intermediate space between the cassette housing 8, which is fixed on the vehicle, and the displaceably arranged rear seat bench 1 if the rear seat bench 1 is transferred into its front end position. In this front end position of the rear seat bench 1, the sheet-like structure 4 is in a taut functional state in which it is stretched open approximately horizontally.

In order to be able to fasten the short sheet-like structure 4, which—like the sheet-like structure 3—extends over virtually the entire length of the cassette housing 8 and therefore over virtually the entire width of the vehicle interior, to the cassette housing 8, the cassette housing 8 is coated with a weldable plastic at least in a longitudinal side region of its outer casing, which region faces the rear seat bench 1. The coated surface preferably corresponds to the entire surface of the longitudinal side of the cassette housing 8, which has a rectangular cross section. As an alternative, the entire outer casing of the cassette housing 8 can be provided with a corresponding coating. Finally, it is also possible to coat just one narrow longitudinal strip continuously over its length with a weldable plastic layer—compared to the height of the longitudinal side of the cassette housing 8. The width of this longitudinal strip is preferably dimensioned to be at least of such a size that a sheet-like strip 9 of the sheet-like structure 4, which strip is to be welded on, can be welded entirely and extensively to this longitudinal strip. The sheet-like structure 4 is provided with a sheet-like strip 9 which forms an end-side sheet-like region of the sheet-like structure 4 and extends over the entire width of the sheet-like structure 4. The sheet-like structure 4 is produced from a plastic sheeting material, preferably from PVC. In another embodiment, the sheet-like structure is produced from a textile material which is coated at least on one side, preferably on both sides, with plastic.

The selection of plastic materials for the sheet-like structure 4, on the one hand, and the coating of the cassette housing 8, on the other hand, is undertaken in such a manner that the corresponding plastics can be welded to one another. The sheet-like structure 4 is preferably produced from a PVC sheeting. The coating of the cassette housing 8 preferably takes place by laminating with PVC material. The sheet-like structure 4 is welded extensively along its longitudinal strip 9 to the cassette housing 8, the welding surface running parallel to the longitudinal edge of the cassette housing 8 in order to ensure a visually attractive impression for the welded-on sheet-like structure 4. It is also possible, instead of an individual, continuous sheet-like structure 4, to provide a plurality of sheet-like structure sections which are adjacent to one another over the vehicle width but can be stretched open or folded up independently of one another. An embodiment of this type is advantageous if the rear seat bench 1 comprises at least two rear seat parts which are longitudinally movable independently of one another. The width of the particular sheet-like structure section is matched to the width of the backrest of the particular rear seat part in order to be stretched open or folded up together with the movement of the corresponding rear seat part.

Figure 2:
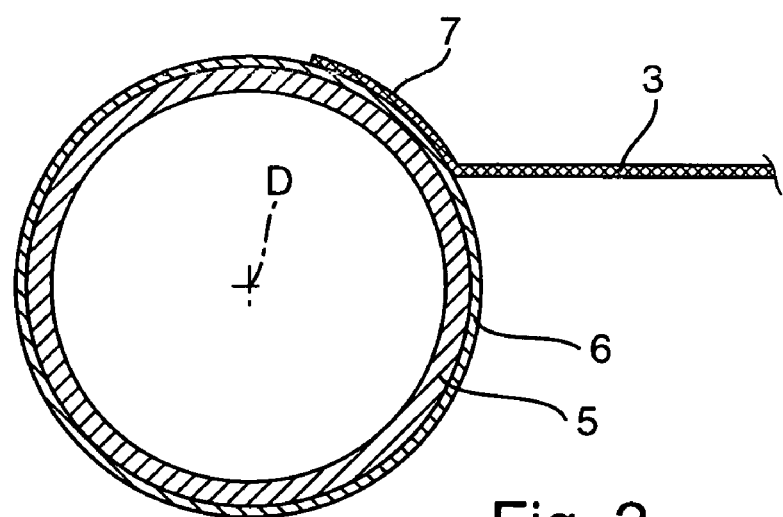
FIG. 2 shows, in an enlarged sectional illustration, a winding shaft of the protection device according to FIG. 1 with the sheet-like structure welded to it.

The sheet-like structure 3 is welded to an outer circumference of the winding shaft 5 by means of an end-side sheet-like section 7 which is continuous over the entire width (FIG. 2). For this purpose, the winding shaft 5, which preferably consists of metal, is provided on its outer circumference continuously and extensively with a casing coating 6 of a weldable plastic material, preferably of PVC. The PVC layer is preferably applied by laminating. The sheet-like structure 3 is produced from a plastic sheeting, preferably a PVC sheeting. In another embodiment, the sheet-like structure 3 is produced from a textile material which is coated at least on one side with a weldable plastic material, in particular PVC. As was so in the case of the sheet-like structure 4, the sheet-like section 7 is delimited from the rest of the sheet-like structure 3 by a fold. The fold runs parallel to the axis of rotation D in the longitudinal direction of the winding shaft 5. By means of welding, the sheet-like section 7 is welded entirely and extensively to a corresponding circumferential section of the winding shaft 5 by the plastic coating 6 having been correspondingly melted onto the outer casing of the winding shaft 5.

Figure 3:
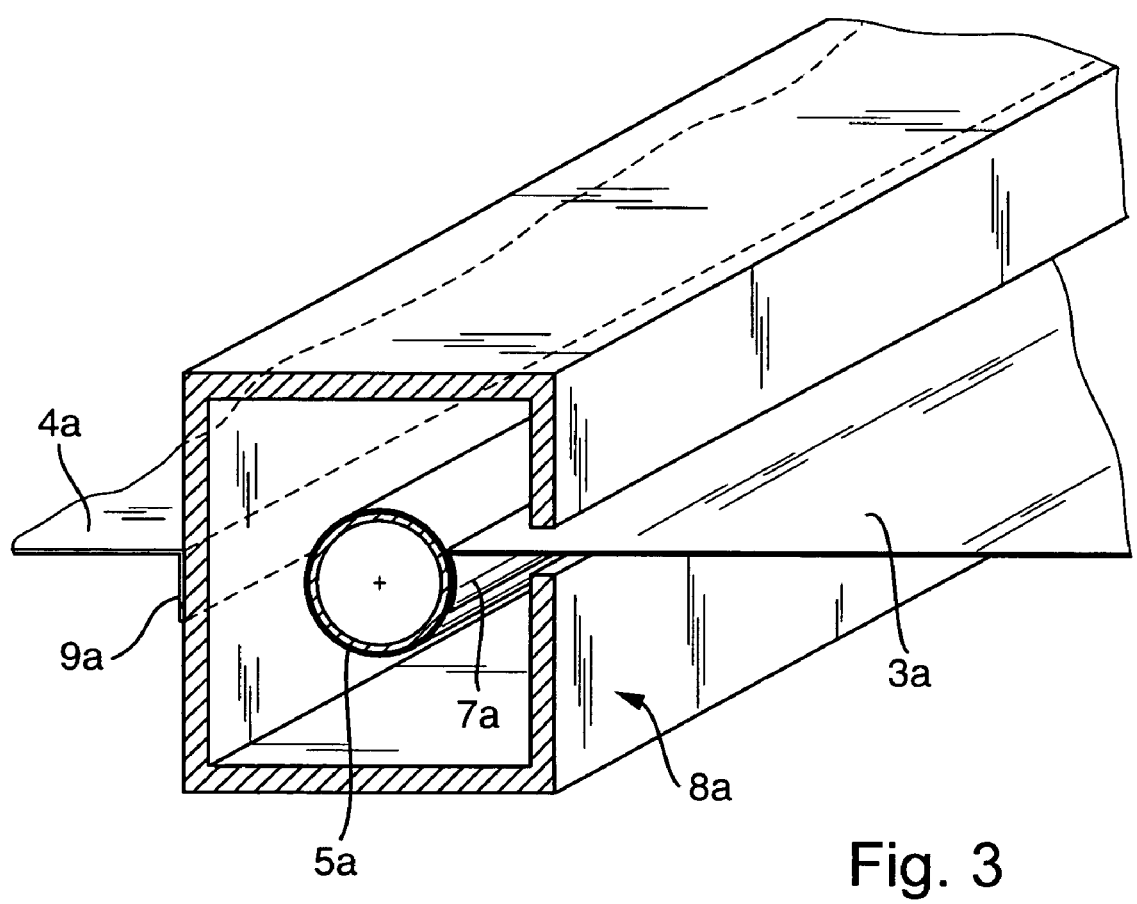
FIG. 3 shows a further embodiment of a protection device similar to FIG. 1 in a diagrammatic, perspective sectional illustration.

The embodiment according to FIG. 3 corresponds essentially to the embodiment described with reference to FIGS. 1 and 2. Functionally identical parts and sections are provided with the same reference numbers with the addition of the letter a. The sole difference in the embodiment according to FIG. 3 is that the sheet-like section 7a is folded over on the sheet-like structure 3 in the opposite direction of rotation, so that it protrudes downwards from the sheet-like structure 3 in the welded-on state. By contrast, in the embodiment according to FIG. 2, the sheet-like structure section 7 had been folded over upwards, so that the welded-on sheet-like structure section 7 according to FIG. 2 is positioned above the rearwardly protruding sheet-like structure 3 on the winding shaft 5. Both in the case of the particular sheet-like structure and in the case of the profiled part to be connected to the sheet-like structure, it is essential for the selection of the plastic materials that the plastic materials of the respective connecting partners are selected in terms of their physical and chemical properties in such a manner that they can be welded to one another.

The invention claimed is:

1. Protection device for a vehicle interior, comprising a first flexible sheet structure which is arranged movably between a rest position and an extended functional position and which is adapted to be connected on a first end side to a vehicle seat back and is connected on a second end side transversely to the direction of extension over its width to a first side of a dimensionally stable cassette housing containing a winding shaft with a second sheet structure attached thereto and extending from a second side of the housing opposite the first side, wherein the sheet structure has a sheet section which is extended over its width and is connected extensively and cohesively to a sheet section of an outer casing of said cassette housing.

2. Protection device according to claim 1, wherein the first sheet structure and the cassette housing are each provided with a weldable plastic surface at least in the region of the sheet sections and the section of the outer casing respectively.

3. Protection device according to claim 1, wherein the cassette housing is laminated with a weldable plastic, in particular PVC, at least in the connecting region.

4. Protection device according to claim 1, wherein the first sheet structure is composed of a sheeting material of weldable plastic, in particular of PVC.

5. Protection device according to claim 1, further comprising the winding shaft being provided with a weldable plastic surface, and the second sheet structure having at least a sheet section with a weldable plastic surface, the respective weldable plastic surfaces welded together to secure the second sheet structure to the winding shaft.

6. Protection device according to claim 5, wherein the sheet section of the second sheet structure is welded to the winding shaft in a direction counter to a winding direction of the winding shaft.

7. Protection device according to claim 1, wherein in said rest position, said flexible sheet structure is adapted to be folded between said seat back and said cassette housing.

8. Protection device according to claim 1, wherein said first sheet structure comprises a plurality of sheet structure sections adjacent to one another over a width of said vehicle interior, and said seat back comprises a plurality of seat back sections, said plurality of sheet structure sections each adapted to be connected to a respective seat back section.

9. Protection device according to claim 1, wherein said sheet section of said first sheet structure depends from said first sheet structure in the extended functional position, as said sheet-like section is connected to said cassette housing.

* * * * *